US009279408B2

(12) United States Patent
Vuorinen et al.

(10) Patent No.: US 9,279,408 B2
(45) Date of Patent: Mar. 8, 2016

(54) WAVE ENERGY RECOVERY SYSTEM

(75) Inventors: Matti Vuorinen, Espoo (FI); Erkki Kasanen, Helsinki (FI)

(73) Assignee: AW-ENERGY OY, Vantaa (FI)

( * ) Notice: Subject to any disclaimer, the term of this patent is extended or adjusted under 35 U.S.C. 154(b) by 630 days.

(21) Appl. No.: 13/583,888

(22) PCT Filed: Mar. 31, 2010

(86) PCT No.: PCT/FI2010/050255
§ 371 (c)(1),
(2), (4) Date: Nov. 6, 2012

(87) PCT Pub. No.: WO2011/121167
PCT Pub. Date: Oct. 6, 2011

(65) Prior Publication Data
US 2013/0047601 A1     Feb. 28, 2013

(51) Int. Cl.
*F03B 13/16* (2006.01)
*F03B 13/18* (2006.01)

(52) U.S. Cl.
CPC ........... *F03B 13/182* (2013.01); *F05B 2240/40* (2013.01); *F05B 2270/00* (2013.01); *Y02E 10/38* (2013.01)

(58) Field of Classification Search
CPC ............ F03B 13/00; B63H 19/02; B63H 1/36
See application file for complete search history.

(56) References Cited

U.S. PATENT DOCUMENTS

| | | | | |
|---|---|---|---|---|
| 4,547,857 A * | 10/1985 | Alexander | ............ | B66D 1/525 212/308 |
| 4,617,518 A * | 10/1986 | Srnka | ...................... | G01V 3/06 324/364 |
| 5,983,162 A * | 11/1999 | Huang | ............... | 702/4 |
| 6,045,339 A * | 4/2000 | Berg | ................... | F03B 13/1815 417/332 |
| 6,533,627 B1 * | 3/2003 | Ambs | .................... | B63B 21/66 114/245 |
| 6,985,403 B2 * | 1/2006 | Nicholson | ............ | G01V 1/3826 114/245 |
| 7,584,609 B2 * | 9/2009 | Welch, Jr. | ............. | F03B 13/187 290/53 |
| 7,881,152 B2 * | 2/2011 | Storteig | .................. | B63B 21/66 114/244 |
| 7,962,431 B2 * | 6/2011 | Iqbal et al. | ....................... | 706/46 |
| 2010/0148504 A1 * | 6/2010 | Gerber | ............................ | 290/42 |
| 2010/0156106 A1 * | 6/2010 | Finnigan | ........................ | 290/53 |
| 2012/0096846 A1 * | 4/2012 | Kalinin | ................... | F03B 13/20 60/497 |

FOREIGN PATENT DOCUMENTS

| | | |
|---|---|---|
| WO | WO 2004/097212 A1 | 11/2004 |
| WO | WO 2006/100436 A1 | 9/2006 |
| WO | WO 2007/019608 A1 | 2/2007 |
| WO | WO 2009/148531 A1 | 12/2009 |

* cited by examiner

*Primary Examiner* — Kenneth Bomberg
*Assistant Examiner* — Shafiq Mian
(74) *Attorney, Agent, or Firm* — Birch, Stewart, Kolasch & Birch, LLP

(57) ABSTRACT

This invention relates to a wave energy recovery system comprising at least a wing hinged on its one edge to make a reciprocating motion in response to kinetic energy of waves or tidal currents, a wave energy converter (WEC) unit, a power-take-off (PTO) means and wave behavior monitoring means. The wave energy recovery system comprises at least a control means to instruct the PTO means to resist the reciprocating movement of the wing by a counter moment.

6 Claims, 4 Drawing Sheets

WAVE ENERGY RECOVERY SYSTEM

Figure 1:
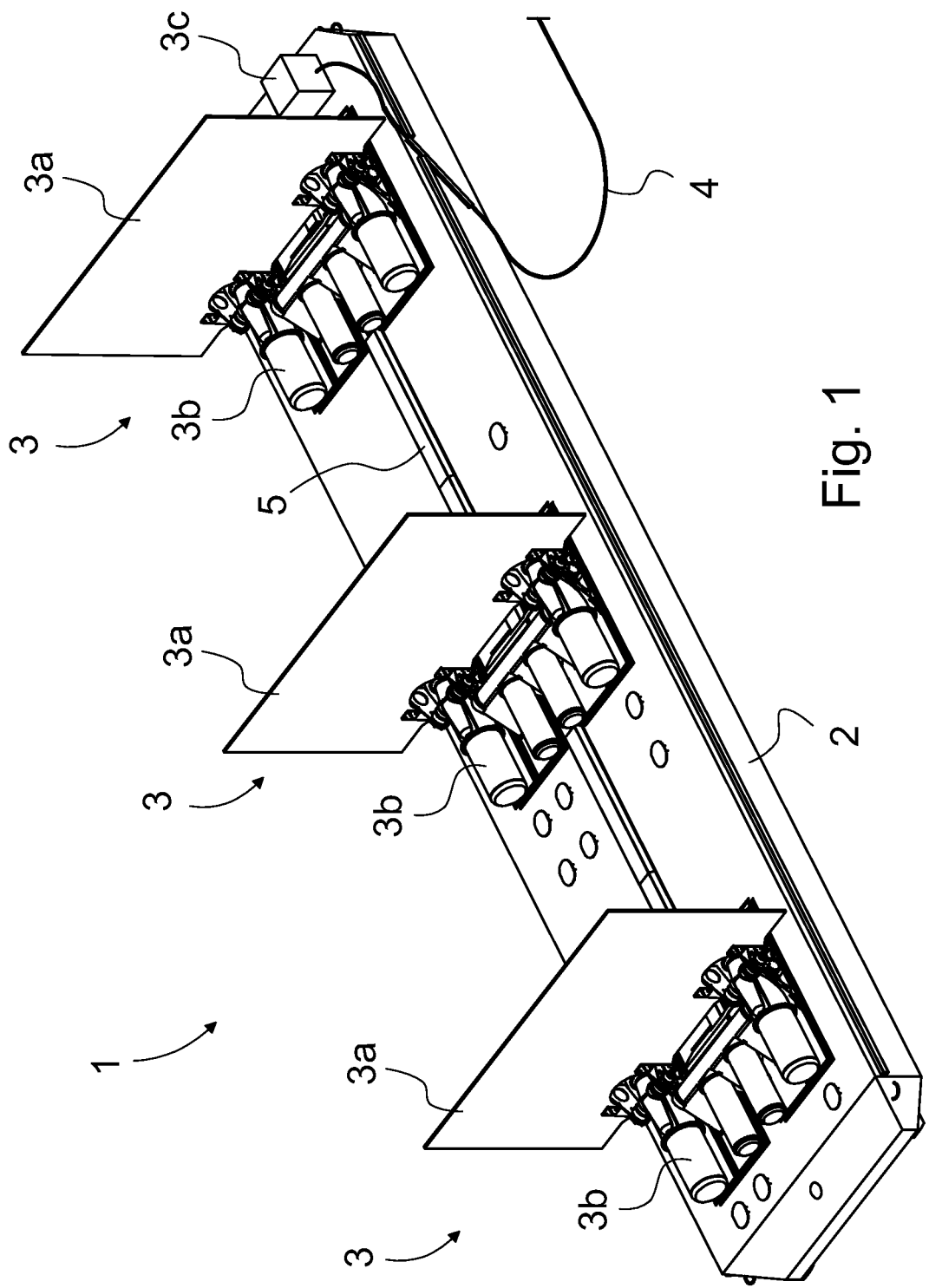

The present invention relates to wave energy recovery system as defined in the preamble of claim 1.

The wave energy recovery system according to the invention is suited very well for instance to be used in connection with an apparatus having a plate like wing hinged with its one edge to make a reciprocating movement caused by wave energy or tidal energy of seawater. The wave energy or tidal energy collected by the apparatus is further converted with a wave energy converter system for instance to electric energy and/or fresh water.

According to the prior art there are various types of wave energy recovery systems where the arrangements include a base and one or more wings of plate type pivotally connected to the base to make a reciprocating or oscillating movement about a rotation axis in response to wave forces or tidal forces. The oscillating movement is then converted for example to electric energy with the help of a generator or alike.

Due to prevailing ocean conditions, which are very much fluctuating, the efficiency of the known wave energy recovery systems have been generally very poor. It has been extremely difficult to adjust the known wave energy recovery systems to collect maximum wave energy both during calm ocean conditions and during stormy ocean conditions. The same wave energy recovery systems have generally not handled well these kinds of extreme conditions and therefore the total efficiency has been so low. One problem is also the fact that the known wave energy recovery systems have produced the converted power unevenly having too high outputs during high wave conditions and too small outputs during calm wave conditions. This has made it difficult to provide a uniform power output suitable for main electric networks.

A known solution for a wave energy recovery system is shown in PCT publication No. WO2009/148531. The publication shows an apparatus having a floating body moving vertically in response to waves and relative to a second body of the apparatus. This kind of wave energy converter (WEC) system includes also a power-take-off (PTO) device coupled between the floating body and the second body to convert the relative motion of the bodies into energy. In order to operate properly the system needs information about the incoming waves for predicting the impact, and about the actual impact of waves that happens somewhat later. Based on this sensor information the computer generates appropriate signals to the WEC such that the average wave power captured by the PTO can be maximized. One problem in this system is the fact that the system has no learning function that could store specified conditions and utilize them later as known conditions. Without the learning function the system has to collect predicting information and actual information all the time and perform calculations all the time to be efficient enough. This consumes energy, makes the system slower and may also cause mistakes in some difficult conditions. Another disadvantage of the system is the fact that it is not practicable in the wave energy converter systems where reciprocating wings are used because the system has no limiting functions to the motion of the reciprocating wings. Because the movement of the wing is not limited the efficiency of the system cannot be good enough in the wave energy converter systems where reciprocating wings are used.

The object of the present invention is to eliminate the drawbacks described above and to achieve a reliable and efficient wave energy recovery system that is capable of capturing a maximum amount of available wave or tidal energy and converting it efficiently to electric energy or to another suitable energy. Likewise the object of the present invention is to achieve a wave energy recovery system that is capable to learn the prevailing ocean conditions and to accommodate to changing conditions in order to produce energy as efficiently as possible. The wave energy recovery system according to the invention is characterized by what is presented in the characterization part of claim 1. Other embodiments of the invention are characterized by what is presented in the other claims.

The solution of the invention has the advantage that thanks to the advanced learning function the energy conversion can be maximized because the system is very adaptable to various ocean conditions. Thus the maximum power from the wing motion can be supplied to the PTO that can further supply maximum converted energy output. Another advantage of the learning function makes it possible to gain the maximum energy at any location where the wave recovery system is installed. With the help of the learning function the wave recovery system of the invention adapts itself to the local conditions in a short time after the system first start. A further advantage is that the wave recovery system of the invention has ready-made driving curves for different ocean conditions. Thus the system is rather efficient from the very beginning and the efficiency improves fast to its top with the help of the learning function. Yet a further advantage is the ability to use the ready-made driving curves for special situations. For example the system can have driving curves for normal use, service use and storms. So the control of the recovery system is very flexible and fast which correspondingly makes it possible to achieve maximum energy recovery in most situations. All in all, the wave recovery system of the invention is very fast and accurate in its control and adjustment functions, which leads to a very high efficiency.

Figure 2:
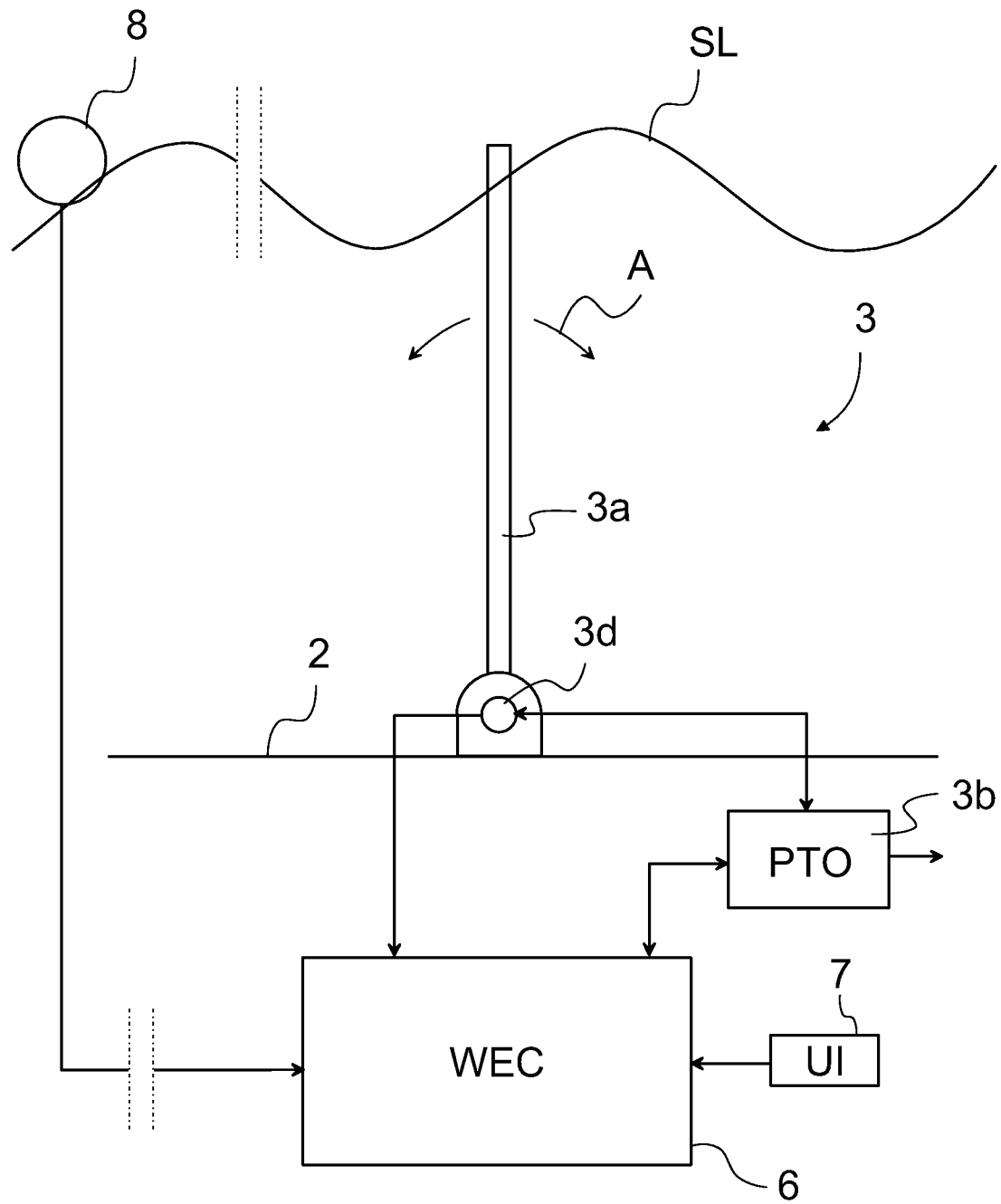
Figure 3:
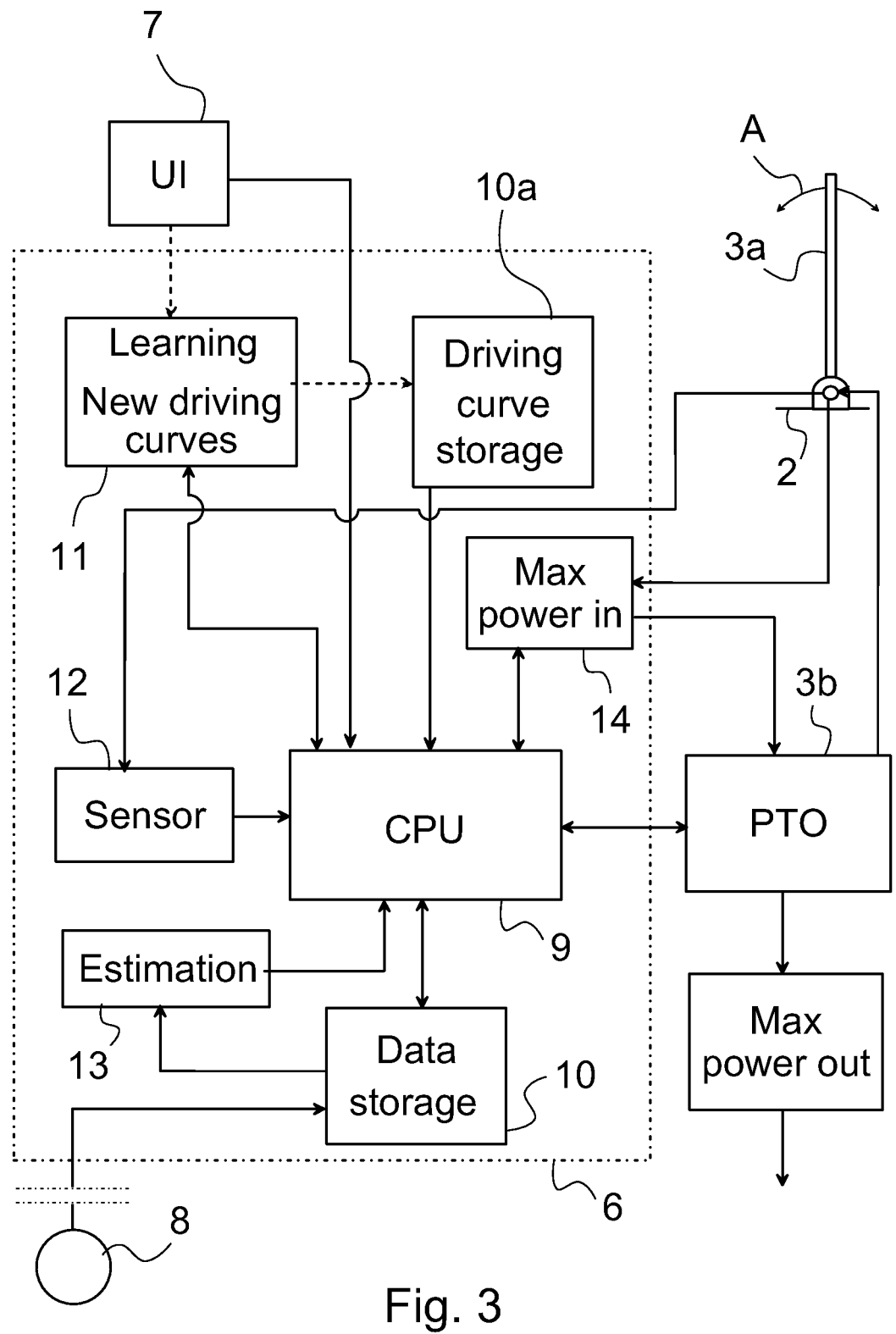
Figure 4:
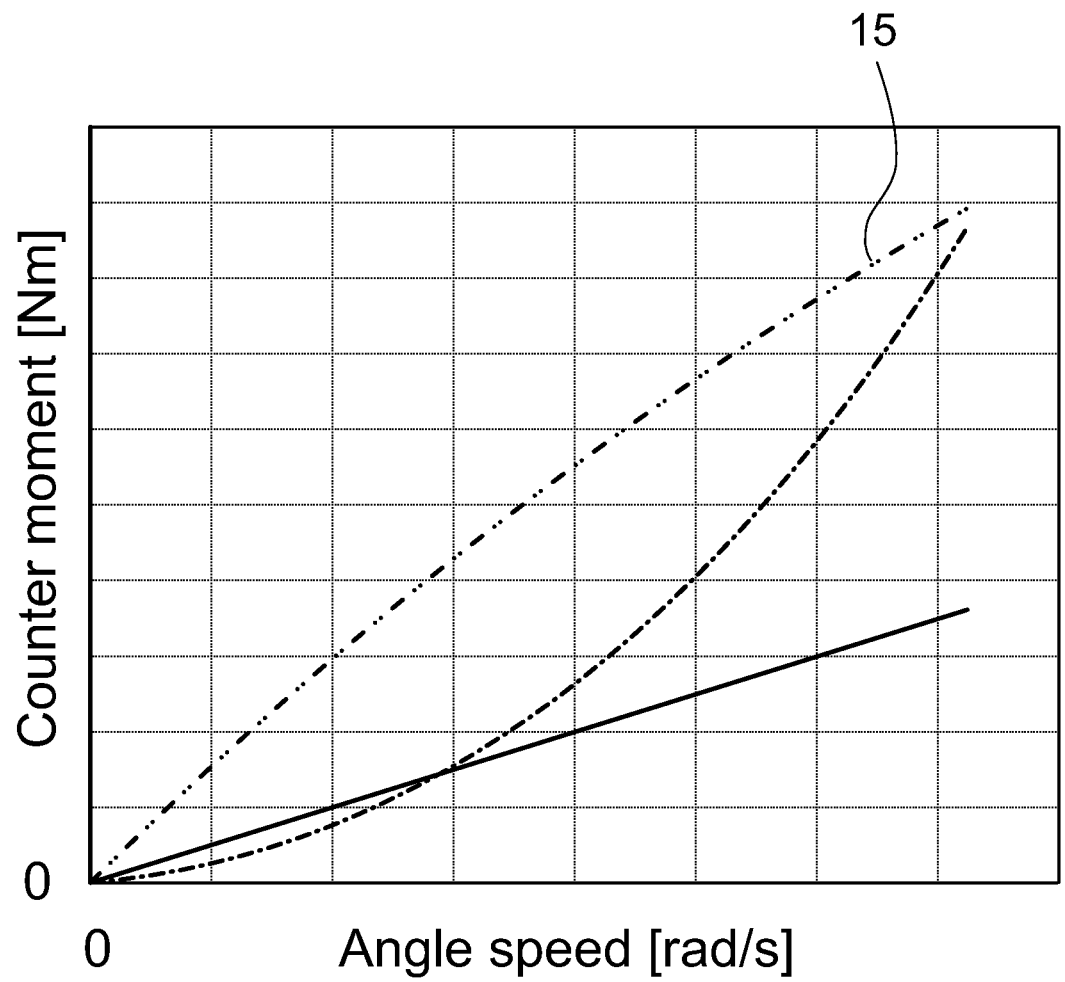

In the following, the invention will be described in detail by the aid of an example by referring to the attached simplified and diagrammatic drawings, wherein FIG. 1 presents in a top view a wave energy recovery module where the wave energy recovery system according to the invention is used, FIG. 2 presents in a simplified and diagrammatic way a wave energy recovery system according to the invention in side view, FIG. 3 presents in a simplified and diagrammatic way various functions of a wave energy recovery system according to the invention and FIG. 4 presents diagrammatically driving curves used in the wave energy recovery system according to the invention.

In FIG. 1 a wave energy recovery module 1 where the wave energy recovery system according to the invention can be used for recovering kinetic energy like wave energy or tidal energy of seawater. The wave energy recovery module 1 according to the example has been anchored in its production site onto the sea bottom and is situated for example in a so-called intermediate water area of the water basin. The intermediate water area refers here to the same area as in the WO publication No. WO2004097212, i.e. to the water basin area, generally ocean area in the depth range of the so-called breaker-line and shallow waters, extending to the wavelength of 0.5. In the intermediate water area the relation of the water depth to the principally prevailing wavelengths is between $\frac{1}{2}$-$\frac{1}{20}$. In that water area the depth of the water is generally from about 8 m to 20 m. In its production site the wave energy recovery module 1 is capable to recover kinetic energy of the waves of the sea and convert the kinetic energy into electric energy. Likewise the wave energy recovery module 1 is capable to make fresh water from the seawater.

The wave energy recovery module 1 comprises at least a body 2 that functions as a base, one or more onto the body 2 attached recovery units 3 for recovering wave energy, collecting means 3c for collecting the energy recovered by the recovery units 3, a cable 4 for transferring the collected energy to further use, and a cable trough 5 equipped with a protective cover for joining all the recovery units 3 of the wave energy recovery module 1 at least into the collecting means 3c.

The body 2 is made for instance of concrete or steel and consists of a group of floating compartments, instrument and machinery chambers that are kept dry, and valve compartments at both ends of the body 2. In the valve compartments there are filling and discharge valves for air and filling and discharge valves for water. Water pipes and air pipes has been installed to go through the separation walls of the compartments in order to allow water and air to run into all the floating compartments and valve compartments. Thanks to its heavy concrete or steel structure the wave energy recovery module 1 remains steady on the sea bottom 12 when the floating compartments are filled with water. Correspondingly floating compartments are big enough to allow the body 2 to float on the surface of the water when the floating compartments are filled with air.

Each recovery unit 3 comprises at least a plate like wing element 3a that is hinged at its lower edge onto the body 2 of the wave energy recovery module 1, and the recovering means or the power-take-of (PTO) means 3b of the wave energy. The wing element 3a is arranged to make reciprocating motion caused by the kinetic energy of the waves, and the recovered energy is either saved into the energy storages situated in the body 2 or transferred through the collecting means 3c and cable 4 to the use of the next unit that can be for instance a collecting station situated on shore. The fresh water produced by the wave energy recovery module 1 can be stored in containers situated in the body 2 of the wave energy recovery module 1, and delivered time to time for further use.

In FIGS. 2 and 3 a wave energy recovery unit 3 of the wave energy recovery system according to the invention is shown in a simplified and diagrammatic way. The plate like wing 3a has been hinged at its lower edge onto the body 2 of the base to make a reciprocation motion about its rotation axis 3d in response to kinetic energy of waves. The motion is shown with an arrow A. The plate like wing 3a may be totally under the sea level SL or it can also reach from the body 2 to the surface of the water. It can be mentioned that the wing 3a may be hinged alternatively at its side edge or top edge.

In addition the wave energy recovery system according to the invention includes at least a wave energy converter (WEC) unit 6, the power-take-off (PTO) means 3b mentioned above, a user interface 7 with which control data and other necessary information can be entered to the system, and a wave behavior monitoring means 8, 13 connected to the WEC unit 6. The WEC unit 6 and the PTO means 3b has been connected at least to each other and to the wing 3a. The WEC unit 6 is arranged to receive data concerning the movement of the wing 3a, and the PTO means 3b is arranged to receive control information from the WEC unit 6 in order to produce a sufficient counter moment to resist the movement of the wing 3a. The PTO means 3b includes at least an electromechanical arrangement having an electric motor coupled mechanically to the wing 3a and acting as a power source to produce the needed counter moment against the movement of the wing 3a. Further the electromechanical arrangement is arranged to act as a generator to produce energy to the converter unit such as an inverter to convert the kinetic energy of the waves into electric energy capable to be supplied to the main electric network.

The WEC unit 6 comprises at least a programmable computer unit 9 equipped with and connected to at least a data storage 10 at least for wave behavior monitoring data, a driving curve storage 10a, learning means 11 for editing driving curves, sensor means 12 for detecting the movements of the wing 3a, an estimation unit 13 for estimation and predicting the behavior of the incoming waves, and PTO control means 14 for controlling the operations of the PTO means 3b. The WEC unit 6 controls the PTO means 3b utilizing pre-made, i.e. beforehand created driving curves that are stored into the driving curve storage 10a. The actual controlling of the PTO means 3b is done by the computer unit 9 that acts as a programmable control computer. The data storage 10 and the driving curve storage 10a are advantageously organized as databases.

The wave behavior monitoring means includes an estimation unit 13 connected to the data storage 10 and to the computer unit 9, and a detector unit 8 such as a buoy or a Doppler radar. The wave behavior monitoring means 8, 13 have been arranged to monitor and measure the sea state outer at the sea and inform at regular intervals the current sea state to the WEC unit 6. The observed sea state includes at least the direction and the height of the observed wave. The interval may be for instance from 5 minutes to one hour, suitably from 15 minutes to 30 minutes, and advantageously for instance 20 minutes. So, for example after every 20 minutes period of time the WEC unit 6 receives the data sent by the detector unit 8 concerning the current sea state somewhat outer at the sea. The wave behavior data is stored into the data storage 10 and conveyed further to the estimation unit 13 in order to analyze it. On the basis of the data sent by the detector unit 8 the estimation unit 13 compares the current wave behavior data to the selected sea state driving curve and if the driving curve does not correspond to the current sea state the current driving curve is replaced by another pre-made driving curve that corresponds better to the current sea state. In this way the best possible efficiency is achieved when the ocean conditions vary.

The learning means 11 of the WEC unit 6 is fitted to observe the energy production related to the current selected driving curve, and to make small changes to the curve. The learning means 11 is arranged to utilize current wave information delivered by the sensor means 12, wave historic data saved into the WEC unit 6 and a suitable program in order to improve the pre-made driving curves. The changes to a current driving curve are made even during one wave. If the small change made by the learning means 11 improves the efficiency the curve is amended according to the change, and the amended curve is saved into the driving curve storage 10a. If the change does not improve the efficiency or even makes the efficiency poorer the curve is not amended and the learning means 11 makes another try to another direction. By doing this way the learning means 11 tries to find and form the best possible driving curves for different ocean conditions just for the site where the wave recovery system has been installed. So, the wave recovery system of the invention improves its efficiency automatically little by little during the very first weeks after its installation and later all time when the need exists. By this way the wave recovery system of the invention adapts itself to the local conditions. The learning means 11 are used also to make seasonal corrections to the driving curves. For instance the ocean conditions vary with different seasons of a year. So, the learning means 11 are arranged to produce best possible driving curves for every season of the year.

An important part of the invention is the sensor means 12 including in the WEC unit 6. Sensor means 12 is connected to the wing 3a to measure the movement of the wing 3a. The sensor means 12 collects the position data of the wing 3a by measuring the current angle of the wing 3a compared for example to the vertical plane. Using historical data of the position information or at least two sequential measurements of the rotation angle of the wing 3a the WEC unit 6 calculates the current angle speed of the wing 3a and gives control instructions based on the angle speed data to the PTO means 3b. The WEC unit 6 includes the PTO control means 14 for that purpose to perform active power control in order to maximize the efficiency of the PTO means 3b continuously. The active power control of PTO means 3b is also arranged to act as fast as possible in order to capture the maximum amount of wave energy. The wave recovery system of the invention is arranged to limit the angle speed of the wing 3a substantially between the values from 1 to 10 Hz, and to adjust the active power control at the fastest even faster than once in about 2 ms, and at the slowest once in about 0.1 s. The wave recovery system of the invention has also means to maximize the product of the angle speed and the braking counter moment produced by the PTO means 3b.

Sensor means 12 and PTO control means 14 together with the computer unit 9 and a separate limiting means are also arranged to limit the movement of the wing 3b if the wing tends to turn too far or too low when the rotation axis 3d is at the lower edge of the wing 3a. If, for example the wing 3b turns too low when the wave is going toward the shore it has not enough time to turn back when the waves comes back. That would make the total efficiency poorer. So, the WEC unit 6 has for instance the mechanical limiting means to prevent the wing 3b to cross certain predefined limits during its reciprocating motion. The movement of the wing 3a and the limits of the movement are controlled by the WEC unit 6 based on the parameters of the pre-made driving curves 15 mentioned above and shown in FIG. 4. The mechanical limiting means can be a separate unit or it can be combined with the PTO means 3b.

The user interface 7 is connected at least to the computer unit 9, to the learning means 11. The user interface 7 is used to enter new data to the computer unit 9 or through the learning means 11 into the driving curve storage 10a. By this way new driving curves can be entered to the system of needed. Also other control parameters can be entered to the WEC unit 6 by the help of the user interface 7.

In FIG. 4 have been presented some typical driving curves 15 used in the wave energy recovery system according to the invention. The driving curves are fitted specific just to the wing type that is hinged at its one edge and makes a reciprocating motion in response to the kinetic energy of the waves, such as the wing 3a. As mentioned earlier the driving curve data has been saved as a database into the driving curve storage 10a. The curves 15 are mainly based on empirical data but also driving curves based on mathematical functions can be used, or the curves may be a combination of empirical data and mathematical functions. The database in the driving curve storage contains different driving curves for different conditions and locations. The types of the driving curves are for instance a normal drive, service drive and storm drive. The wave energy recovery system according to the invention includes also a set of default driving curves that are always unchanged or changed very seldom and if changed the changes are made only manually and as a result of a careful consideration. The system has been arranged so that if something unusual happens the wave energy recovery system returns automatically to its initial state where it uses the default driving curves with default parameters. The default driving curves can be also used manually in certain situations.

In FIG. 4 three different curves 15 are shown. In the curves the angle speed of the wing 3b is seen on the X-axis and the needed counter moment of the PTO means 3b is shown on the Y-axis. For instance, if according to the prevailing sea state, the lowest curve is selected for the present situation, the sensor means 12 of the WEC unit 6 determines the angle speed of the wing 3b. Then the corresponding angle speed is sought on the selected curve and the corresponding counter moment is determined on the Y-axis. Thereafter the information containing the corresponding counter moment that is needed for the efficient wave energy capture is sent to the PTO control means 14 that further instructs the PTO means 3b to produce the needed counter moment to the wing 3a, which counter moment has been selected as suitable as possible to capture the wave energy in the most efficient way just in this situation and in these ocean conditions.

It is obvious to the person skilled in the art that the invention is not restricted to the example described above but that it may be varied within the scope of the claims presented below. Thus, for example, the structure of the WEC unit can vary.

It is also obvious to the person skilled in the art that the PTO means can differ from the device mentioned above. It can be for instance a hydraulic arrangement instead of the electromechanical arrangement.

The invention claimed is:
1. A wave energy recovery system comprising:
    at least one wing hinged on its one edge to make a reciprocating motion in response to kinetic energy of waves or tidal currents;
    a power-take-off (PTO) device;
    wave behavior detector, including a buoy or a Doppler radar, that detects current sea state information; and
    a wave energy converter (WEC), the wave energy converter including
        a storage medium storing a plurality of driving curves corresponding to different sea states,
        a sensor that detects the reciprocating movement of the at least one wing,
        a central processing unit (CPU) configured to
            compare current sea state information received from the wave behavior detector with a currently selected driving curve and if the currently selected driving curve does not correspond sufficiently to the current sea state, to replace the current driving curve with another pre-made driving curve that corresponds better to the current sea state,
            instruct the PTO device to resist the reciprocating movement of the wing by applying a counter moment based on the currently selected driving curve, and
            observe energy production corresponding to application of the counter moment and to make changes to the currently selected driving curve utilizing the current wave information produced by the sensor, and historic wave data.

2. The wave energy recovery system according to claim 1, wherein the information received from the sensor includes information about the angle speed of the wing.

3. The wave energy recovery system according to claim 1, wherein the information received from the sensor includes information about the position of the wing from which information the angle speed of the wing is calculated.

4. The wave energy recovery system according to claim 1, wherein the storage medium includes a database including a group of pre-made driving curves that are arranged to indicate the needed counter moment when instructing the PTO device to resist the reciprocating movement of the wing.

5. The wave energy recovery system according to claim 1, wherein the wave behavior detector measures the sea state outer at the sea and to inform at regular intervals the current sea state to the WEC unit, and WEC further comprises a data storage for the data supplied by the wave behavior detector.

6. The wave energy recovery system according to claim 1, wherein the wave energy recovery system further includes a set of default driving curves by the help of which the system has been arranged to return to its initial state after an unusual occurrence.

* * * * *